United States Patent [19]

Heeks et al.

[11] Patent Number: 4,561,727
[45] Date of Patent: Dec. 31, 1985

[54] TWO-DIMENSIONAL ACOUSTO-OPTIC DEFLECTION ARRANGEMENT

[75] Inventors: John S. Heeks, Old Harlow; Roger E. Cooke, Stortford, both of England

[73] Assignee: International Standard Electric Corporation, New York, N.Y.

[21] Appl. No.: 554,737

[22] Filed: Nov. 23, 1983

[30] Foreign Application Priority Data

Nov. 26, 1982 [GB] United Kingdom ............... 8233768

[51] Int. Cl.[4] .............................................. G02F 1/13
[52] U.S. Cl. .................................................. 350/351
[58] Field of Search ............................... 350/351, 358

[56] References Cited

U.S. PATENT DOCUMENTS

| 3,958,863 | 5/1976 | Isaacs et al. | 350/358 |
| 4,031,529 | 6/1977 | Borel et al. | 350/351 |
| 4,040,047 | 8/1977 | Hareng et al. | 350/351 |

OTHER PUBLICATIONS

Dewey et al., "The Application of GaAlAs Lasers to High-Resolution Liquid-Crystal Projection Displays", IBM J. Res. & Develop., vol. 26, 3-1982, pp. 177-185.
Maydan, D., "Infrared Laser Addressing of Media for Recording and Displaying of High-Resolution Graphic Information", Proc. IEEE, 7-1973, pp. 1007-1013.
Anderson, L. K., "Projecting Images with Liquid Crystals", Bell Lab. Record, 7,8-74, pp. 223-229.

Primary Examiner—William H. Punter
Attorney, Agent, or Firm—John T. O'Halloran; Jeffrey P. Morris

[57] ABSTRACT

A two-dimensional acousto-optic deflection arrangement including a source (10a) of electromagnetic radiation, means (18) for modulating the source, means for collimating the output of the source into a beam, and an acousto-optic deflection means (12a) situated in the path of said beam, the deflection means comprising a rectangular body of acousto-optic material provided on two adjacent surfaces with electro-acoustic transducers arranged to launch orthogonal bulk acoustic waves into the material transverse the direction of propagation of radiation through the material whereby the focussed radiation can be scanned in two dimensions over an area illuminated by a source (20) secondary illumination. Typically the scanned area comprises a thermo-optically addressable liquid crystal display device (17).

2 Claims, 3 Drawing Figures

TWO-DIMENSIONAL ACOUSTO-OPTIC DEFLECTION ARRANGEMENT

This invention relates to a two-dimensional acousto-optic deflection arrangement and is suitable for a thermo-optically addressed liquid crystal display (LCD) device.

A thermo-optic liquid crystal display cell filled with a smectic liquid can be used to form a projection system in which a focussed laser beam is employed to write a pattern on a plain background. If the cell is constructed to confine a thin layer of liquid crystal exhibiting a smectic phase, and the two major interior surfaces of the cell are treated to promote homeotropic alignment of the liquid crystal molecules adjacent those surfaces, then the visual clarity of such a layer in the isotropic liquid phase is preserved if it is first heated and then slowly cooled to transform it into the smectic phase. This clarity is preserved in the smectic phase because the slow rate of cooling enables the liquid crystal molecules to assume homeotropic alignment. If the two major interior surfaces are also provided with transparent electrode coatings so that an electric field can be applied across the thickness of the liquid crystal layer then, by the application of a suitable a.c. electric field, the rate of cooling may be increased. This complete homeotropic alignment state is effectively a visually plain field or background. Substantially distinctive lines can then be written on to this plain field by tracking a focussed laser beam across the surface of the liquid crystal layer at an appropriate rate, and in the absence of an electric field, to supply sufficient energy to the regions successively illuminated by the focussed beam to result in a scattering state remaining after rapid cooling of the locally heated regions of the liquid crystal material. Such a mechanism is disclosed in U.S. Pat. No. 3,796,999.

According to the present invention there is provided a two-dimensional acousto-optic deflection arrangement including a source of electromagnetic radiation, means for modulating the source, means for collimating the output of the source into a beam, an acousto-optic deflection means situated in the path of said beam, the deflection means comprising a rectangular body of acousto-optic material provided on two adjacent surfaces with electro-acoustic transducers arranged to launch orthogonal bulk acoustic waves into the material transverse the direction of propagation of radiation through the material whereby the collimated radiation can be scanned in two dimensions over a predetermined area.

Embodiments of the invention will now be described with reference to the accompanying drawings, in which.

Figure 1:
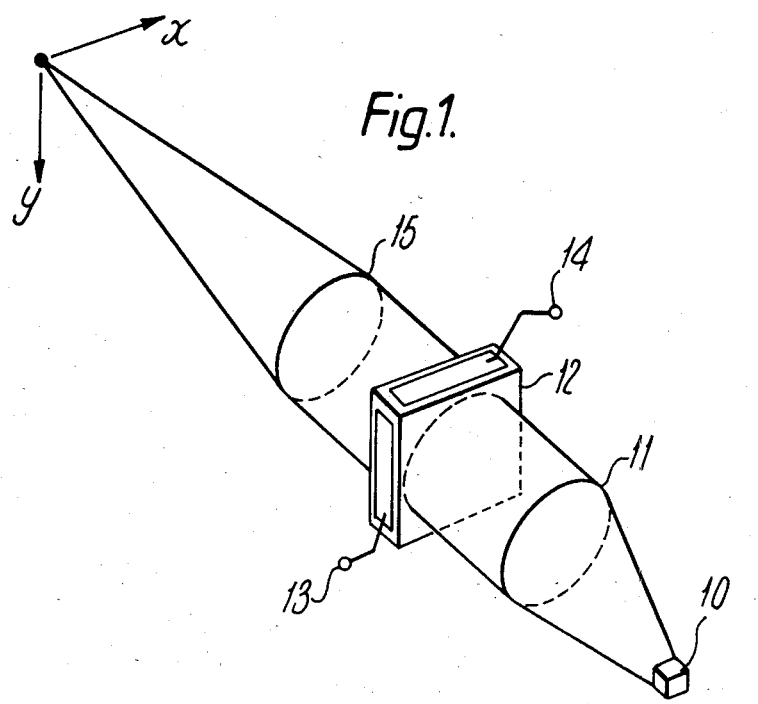
FIG. 1 illustrates a simple deflector arrangement.

In the arrangement shown in FIG. 1 a source 10 of electromagnetic radiation, e.g. a semiconductor junction laser, has its output collimated by a first lens 11 into a parallel beam. A rectangular body 12 of acousto-optic material, e.g. lithium niobate or tellurium dioxide has electro-acoustic bulk wave transducers 13, 14 on adjacent surfaces arranged to launch bulk waves into the material transverse the direction of propagation of the beam through the body 12 whereby deflection of the emergent radiation can be effected independently in two orthogonal directions x,y. Finally the emergent radiation is focussed by a second lens 15 to a spot at the required distance. Thus by suitable energising of the transducers 13 and 14 the spot of light can be scanned in either a raster or random access manner across a surface.

Figure 2:
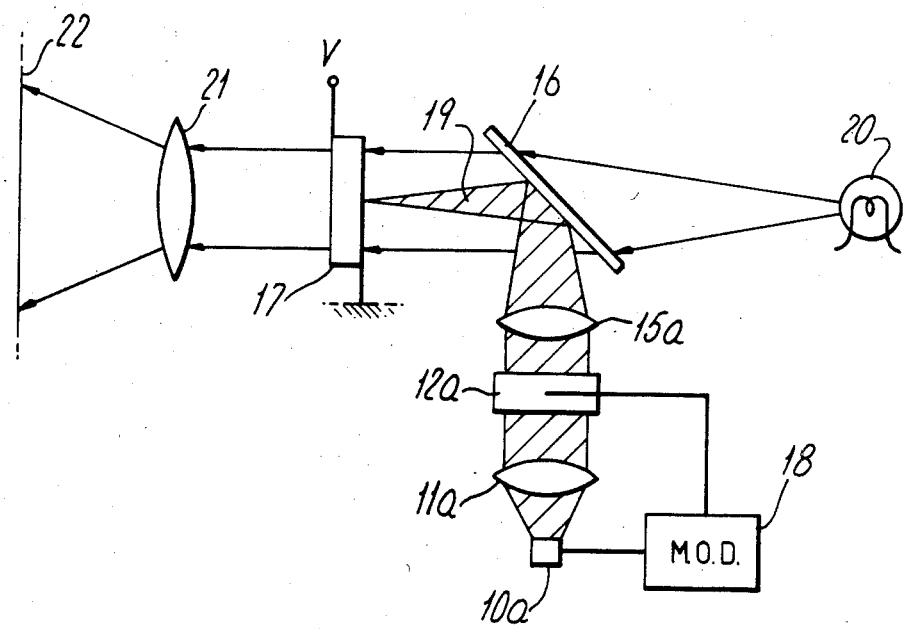
FIG. 2 illustrates in schematic form a two-dimensional acousto-optic deflector arrangement with secondary illumination.

In the arrangement shown in FIG. 2 the light from a laser source 10a is scannable via optics 11a, 15a, 2-dimensional bulk wave deflector 12a and e.g. a partially silvered mirror 16 across the face of a thermo-optically addressable liquid crystal cell 17. The output of the laser source 10a is controlled by a modulator 18 which also controls the deflector 12a. The cell 17 may be first subjected to heating and cooling in the presence of an electric field as previously described to induce an overall homeotropic state. The output of the laser may then be modulated and the modulated beam 19 scanned across the cell surface in the absence of an electric field to "write" in information to be displayed in the form of a substantially distinctive pattern. A source of secondary illumination 20 is then arranged to illuminate, via the partially silvered mirror 16, the cell 17 so that the written-in pattern can be projected via optics 21 onto a screen 22. Typically the laser source 10a is a GaAlAs laser.

It will be appreciated that the positions of the laser souce 10a etc and the secondary illumination lamp 20 may be interchanged.

Figure 3:
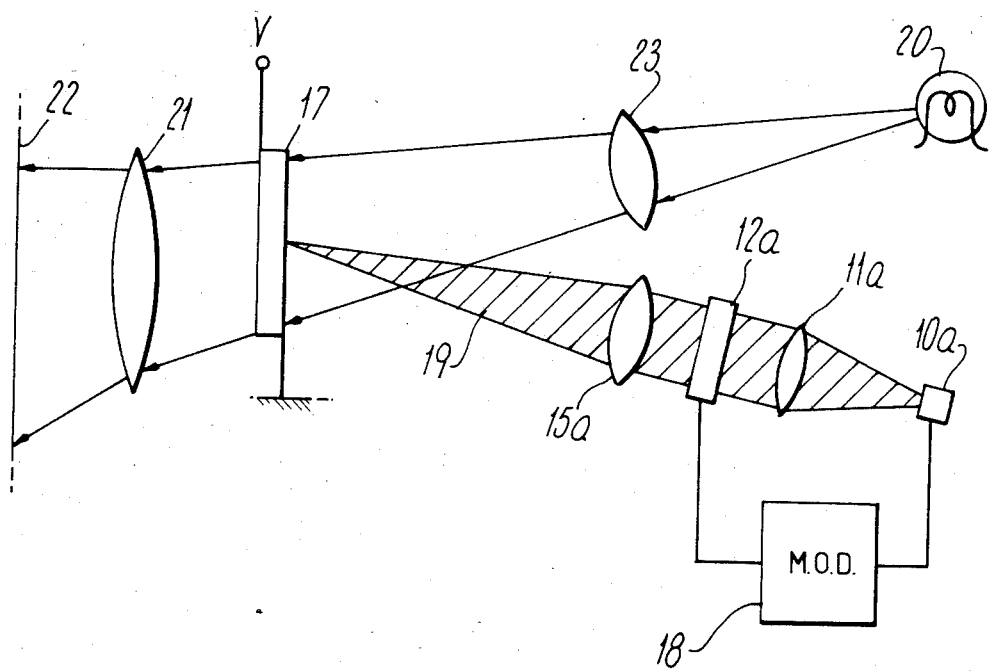
FIG. 3 illustrates in schematic form an alternative arrangement to that of FIG. 2.

In the alternative arrangement shown in FIG. 3 there is no half-silvered mirror. Instead the laser 10a and lamp 20 are side by side, one or each slightly offset with respect to the cell 17. The degree of misalignment is small enough to permit effective writing-in of information and subsequent illumination of the cell. Additional optics 23 may be included in the secondary illumination path if required.

Whilst the main feature of the invention has been described so far only in the context of a display it is also applicable in other fields. For example the deflection arrangement may be suitable for writing information or patterns on photosensitive surfaces generally. Applications such as pattern forming on a photoresist layer for manufacture of printed circuits, or for writing on photosensitive paper which is subsequently treated to fix the images, are envisaged.

We claim:

1. A two-dimensional acousto-optic deflection arrangement including a laser for providing a source of electromagnetic radiation, means for modulating the source, means for collimating the output of the source into a beam, an acousto-optic deflection means situated in the path of said beam, the deflection means comprising a rectangular body of acousto-optic material provided on two adjacent surfaces with electro-acoustic transducers arranged to launch orthogonal bulk acoustic waves into the material transverse to the direction of propagation of radiation through the material whereby the collimated radiation can be scanned in two dimensions over a predetermined area, a source of secondary illumination arranged to illuminate said predetermined area, and a thermo-optically addressable liquid crystal display device positioned so as to be scannable by the deflected focussed radiation and illuminated by said source of secondary illumination and wherein the source of electromagnetic radiation and the source of secondary illumination are disposed with their outputs orthogonal to one another, the arrangement including mirror means for combining the outputs arranged to deflect one of said outputs to be colinear with the other output; and wherein said source of electromagnetic radiation is a GaAlAs laser.

2. A thermo-optically addressable liquid crystal display including a two dimensional acousto-optic deflection arrangement as claimed in claim 1.

* * * * *